United States Patent [19]

Brandelik

[11] Patent Number: 5,162,940
[45] Date of Patent: Nov. 10, 1992

[54] MULTIPLE ENERGY LEVEL, MULTIPLE PULSE RATE LASER SOURCE

[75] Inventor: Joseph E. Brandelik, New Carlisle, Ohio

[73] Assignee: The United States of America as represented by the Secretary of the Air Force, Washington, D.C.

[21] Appl. No.: 22,902

[22] Filed: Mar. 6, 1987

[51] Int. Cl.$^5$ ............................................. H01S 3/05
[52] U.S. Cl. ........................................................ 359/333
[58] Field of Search ........................... 330/4.3; 372/9

[56] References Cited

U.S. PATENT DOCUMENTS

| | | | |
|---|---|---|---|
| 3,753,152 | 8/1973 | Pettipiece | 330/4.3 X |
| 3,794,929 | 2/1974 | Carr | 330/4.3 |
| 3,914,710 | 10/1975 | Young | 330/4.3 X |
| 3,928,811 | 12/1975 | Hughes | 330/4.3 |
| 3,975,693 | 8/1976 | Barry et al. | 331/94.5 C |
| 4,019,151 | 4/1977 | Brueckner et al. | 330/4.3 |
| 4,053,845 | 10/1977 | Gould | 330/4.3 |
| 4,069,458 | 1/1978 | Farcy et al. | 330/4.3 |
| 4,186,353 | 1/1980 | Boutineau | 330/4.3 |
| 4,191,928 | 4/1980 | Emmett | 330/4.3 |
| 4,233,571 | 11/1980 | Wang et al. | 331/94.5 C |
| 4,321,550 | 3/1982 | Evtuhov | 330/4.3 |
| 4,326,175 | 4/1982 | Dehney et al. | 372/106 |
| 4,344,042 | 8/1982 | Hon | 330/4.3 |
| 4,500,855 | 2/1985 | Feinberg | 330/4.3 X |

OTHER PUBLICATIONS

L. M. Frantz and J. S. Nodvik "Theory of Pulse Propagation in a Laser Amplifier" in Journal of Applied Physics, vol. 34, p. 2346, Aug. 1963.

N. F. Andreev et al., "Coherent Frequency Doubling in Non-Linear Non-Homogeneous Elements", Translation of JETP Pis'ma Vzhurnal Eksperimental noi i Teore ticheskoi Fiziki (Letters to Journal of Experimental and Theoretical Physics, Academy of Sciences of the USSR) JETP Letters, vol. 30, No. 5, p. 286 (1979).

N. G. Basov et al., "Inversion of Wavefront in SMBS of a Depolarized Pump", JETP Letters, vol. 28, No. 4, p. 197 (1978).

Primary Examiner—Mark Hellner
Attorney, Agent, or Firm—Gerald B. Hollins; Donald J. Singer

[57] ABSTRACT

A multiple energy level, multiple pulse repetition frequency, common boresight laser energy source apparatus which employs phase conjugate energy reflection, achievable in a high-pressure gas retro-reflecting cell, to compensate for aberrations of the energy beam occurring in other optical elements. Use of the multiple energy level source in military, medical and industrial settings is described with the lowest level output energy being "eye-safe" for use by operators performing preliminary positioning and alignment of the source. The disclosure includes description of embodiment element limitations and identifications of alternate elements usable to overcome these limitations. Parallel and serial dispositions of the optical elements and discussion of advantages and limitations incurred thereby is also included.

20 Claims, 3 Drawing Sheets

MULTIPLE ENERGY LEVEL, MULTIPLE PULSE RATE LASER SOURCE

RIGHTS OF THE GOVERNMENT

The invention described herein may be manufactured and used by or for the Government of the United States for all governmental purposes without the payment of any royalty.

BACKGROUND OF THE INVENTION

This invention relates to the field of phase conjugate enhanced lasers having selectable output energy levels and selectable pulse repetition frequencies and also having fixed boresight axis alignment.

In many laser settings there exists a need for performing a manual positioning or alignment of the laser prior to the application of work achieving energy to the laser apparatus and to a selected workpiece area. Medical settings such as in the laser surgery commonly employed for detached retina repair and tumor removal, and laser weapon systems, are examples of laser uses which are benefitted by a multiple energy capability in the laser. In an airborne laser weapon system, for example, it is frequently necessary to calibrate or aim the weapon system while the host aircraft is located on a taxi strip or otherwise in the presence of personnel, friendly aircraft, and property. In such a scenario, the inability of the laser weapon system to function in a safe low energy operating mode, can represent both a hazardous and an inconvenient and energy-demanding limitation of the system. A multiple energy level laser apparatus is also desirable for industrial uses such as cutting, drilling, and welding, where common boresight and multiple energy level operation properties are useful in achieving the initial positioning and the subsequent heat generating functions.

Heretofore, the achievement of multiple output energy levels in a laser system has required the use of plural lasers that feed a common optical output apparatus from dispersed but precisely aligned physical locations. Clearly, the establishment and maintaining of such physically displaced but precisely aligned laser sources is inconvenient and a source of ongoing difficulty. The present apparatus circumvents this inconvenience by providing in a single laser source the capability for multiple output energy levels and multiple pulse repetition frequency operation.

In airborne avionic applications, a "very low" energy mode of laser operation is desirable for eye-safe boresighting of the laser apparatus with other avionics system components. In this environment, a greater energy level, "low energy" laser operating mode is also characteristic of optical search and related functions. Additionally, in this environment, "medium energy" modes of laser operation are desirable for weapon usage and other long-range functions. The presently-existing approach to satisfying these needs involves separate laser sources boresighted through common optics. Since the primary energy available in an avionic environment is limited, it is often not practical to operate for example three separate lasers simultaneously in a separate source, common optic boresighting arrangement. As a result, intermittent and transient operation of the individual laser sources must be considered—an arrangement which has warm-up stability and other disadvantages.

The most desirable existing technology for realizing a single laser having a variety of energy output formats includes the use of a multiple lamp cavity—an arrangement that is inefficient and limited in output power. Additionally, single lasers having multifunctional capability have not generally been compatible with techniques that allow efficient wavelength agility without being susceptible to a high risk of optical damage.

SUMMARY OF THE INVENTION

In the present invention, a laser source having multiple energy output levels combined with a fixed and unchanging output energy boresight axis and employing either of two approaches is achieved. In each of these approaches, election between laser amplifiers capable of differing energy output levels is accomplished by optical apparatus responsive to quantitative consideration of energy and threshold behavior in laser amplifiers and phase conjugate reflection devices.

An object of the present invention, therefore, is to provide a laser apparatus capable of common boresight alignment in the presence of multiple pulse repetition frequency operation and multiple energy level operation.

Another object of the invention is to provide a laser apparatus capable of high output beam quality.

Another object of the invention is to provide laser arrangements which are both serially organized and parallelly organized, for achieving multiple energy level, common boresight axis beams of laser energy.

Another object of the invention is to provide a multiplicity of arrangements for selecting between alternate laser amplifiers in a common boresight laser source apparatus.

Another object of the invention is to provide a multiple energy level laser apparatus capable of use with a nonlinear apparatus in generating laser energy signals of varying spectral wavelength.

Another object of the invention is to provide a laser energy source apparatus of multiple energy level operating capability wherein each of the energy operating levels is benefitted by the laser beam enhancement of phase conjugate reflection.

Another object of the invention is to provide a multiple energy level, multiple pulse repetition frequency laser apparatus that operates with the benefit of stimulated Brillouin scattering (SBS) effects.

These and other objects of the invention are achieved by multiple energy level, common boresight, laser apparatus which includes the combination of a laser oscillator source of low energy level optical beam signal, a first laser amplifier longitudinally disposed about a first axis, the first amplifier having both an amplifying operating mode and a signal conducting operating mode and having optical signal communicating ports located along the first axis at opposed first amplifier ends, one of the ports being an output port of the apparatus, first phase conjugate reflector means located along the first axis at a first amplifier end for receiving a first optical signal from the adjacent first amplifier port and for returning to the port a phase conjugate enhanced variation of the first optical signal, means for directing the low energy level optical beam oscillator signal along the first axis into an input port of the first laser amplifier, and selection means determinative of the amplifying and signal conducting operating mode in the first laser amplifier, whereby laser optical signal delivered from the first amplifier output port is low energy level phase conjugate enhanced oscillator signal or an amplified higher energy level, phase conjugate enhanced signal in response to a conductive or amplifier operating mode determination by the selection means.

Additional objects and features of the invention will be understood from the following description and the accompanying drawings.

DETAILED DESCRIPTION

Figure 1:
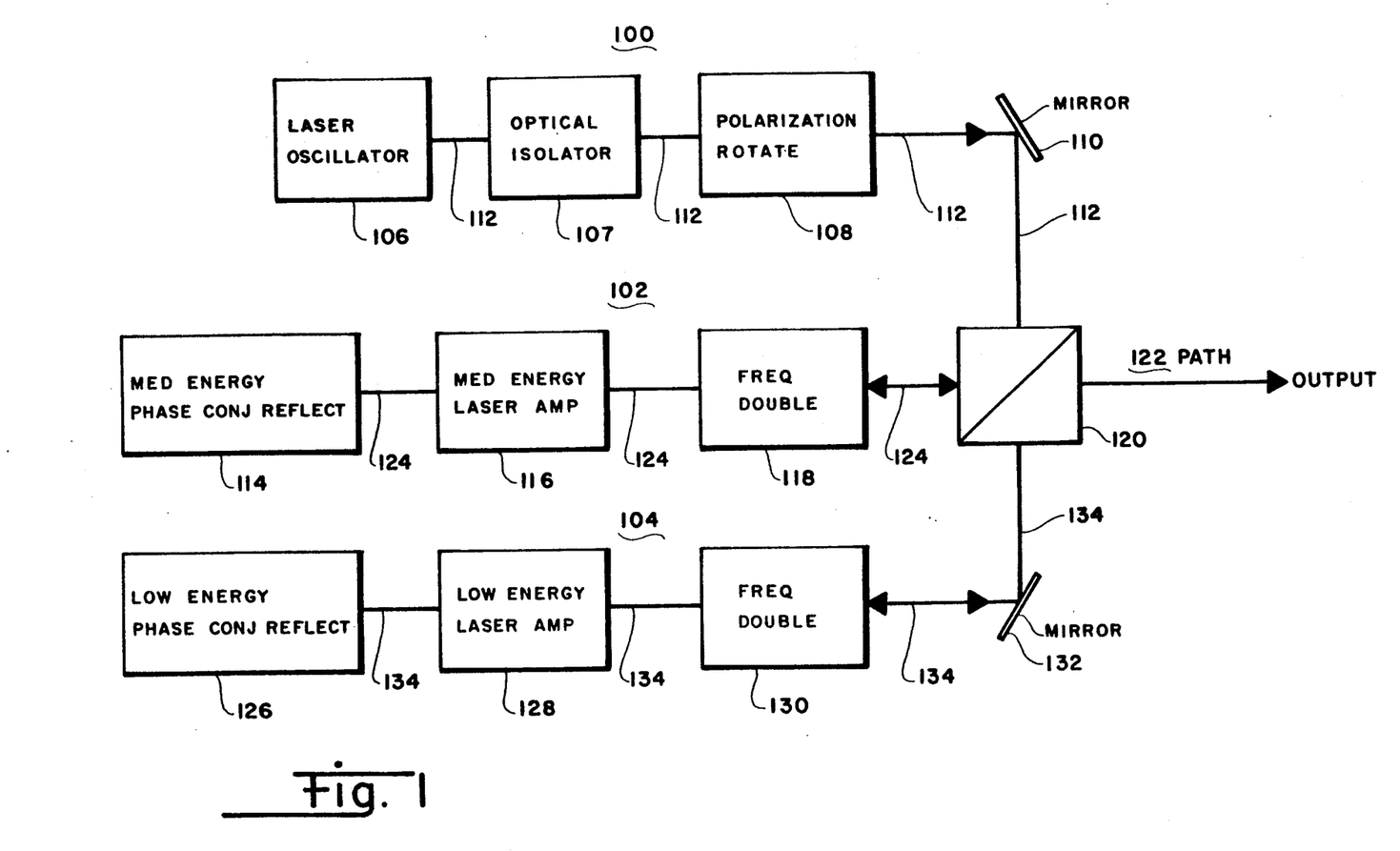
FIG. 1 is a block diagram of a parallel organized variable energy level constant boresight laser apparatus.

FIG. 1 in the drawings shows apparatus capable of generating laser optical energy having a plurality of energy level ranges. The FIG. 1 apparatus provides multiple level laser output energy by way of using the "very low" level energy developed in an oscillator 106 and flowing along components of the path 100 either as the output energy coupled to the path 122 or as a signal that is amplified in either the low level laser amplifier 128 or in the medium energy level laser amplifier 116. In each instance, the output energy flowing along the path 122 is enhanced through signal processing in one of the phase conjugate reflectors 114 and 126 as is described subsequently.

The FIG. 1 apparatus includes four optical paths 100, 102, 104, and 122 which converge in the polarizing beamsplitter 120. The optical paths 100, 102 and 104 include components 112, 124, and 134, respectively, by which optical energy is communicated between paths of the FIG. 1 apparatus. Distributed along the path 100 in FIG. 1 are the optical elements used for generating and directing a laser signal having "very low" energy magnitude; these elements include the laser oscillator 106, optical isolator 107, polarization rotator 108, and the mirror or reflector 110.

One of the amplifying optical paths 102 and 104 in FIG. 1 can be selectably employed to increase the energy level of a signal received from the oscillator 106 and the path 100 components. Included in the path 102 is the frequency doubler 118, the laser amplifier 116 which is functional at the "medium" energy level of laser operation, and the phase conjugate reflector 114 which is also arranged to operate in the "medium" level energy region. The alternate path 104 includes the frequency doubler 130, the laser amplifier 128 capable of operating in the "low" and "very low" energy ranges, as described below, the reflector or mirror 132 of the planar type, and the phase conjugate reflector 126 which is capable of reflection in either the "very low" or "low" energy operating ranges. Selection between communicating the laser oscillator signal to the path 102 elements or the path 104 elements is accomplished by the beamsplitter 120.

Operation

Operation of the FIG. 1 apparatus involves generation of a 1.06 micrometer infrared oscillator signal in the oscillator 106, passing this signal through optical isolation filters 107 which provide oscillator and amplifier isolation, transmission through a Pockels cell embodiment of the polarization rotator 108 and then impressing the signal on a polarized beam-splitter optical switch 120 for transmission to one of the paths 102 or 104—depending upon the state of the Pockels cells in the polarization rotator 108. If transmission to the path 102 occurs in the beamsplitter switch 120, the output signal at the path 122 is in the "medium" or for example, 500 millijoule energy level range, while if transmission to the path 104 occurs in the beam-splitter switch 120, the output signal is in the "low", for example, 100 millijoule level energy range or in the "very low" level, for example, 1-5 millijoule energy range, the latter distinction depending upon events occurring in the path 104.

During the course of a first signal passage through the amplifiers 116 and 128, the signal is increased in energy level to the 40 to 50 millijoule range and signals of this level are then impressed on the phase conjugate SBS mirrors or reflectors 114 and 126. Even at these relatively modest signal levels, reflection of 70 to 80% of the received energy occurs. The small amount of non-reflected energy lost in the SBS reflector is of little consequence to the overall efficiency of the FIG. 1 apparatus. During the return or second pass of reflected energy through the amplifiers 116 and 128, the amplifiers achieve saturation and thereby cause the amplifier output energy level to be relatively insensitive to oscillator energy level or environmental fluctuations. By way of the phase conjugate reflection at 114 and 126, such characteristics of the reflected optical signal as beam aberration, beam wander and imperfections introduced by the amplifier rods and the frequency doublers are compensated. The returning amplified signals reach an energy level in the range of 550 millijoules and 100 millijoules in the paths 102 and 104, respectively.

In each instance, this second pass energy level is sufficient to result in approximately 50% energy conversion in the frequency doublers 118 and 130, the converted signal being of double frequency, or 532 nanometers wavelength and thereby residing in the green portion of the spectrum. Since frequency doubling and the resulting change of polarization in the doublers 118 and 130 affects only the higher-level or returning energy pulses, the 532 nanometer energy in each of the paths 102 and 104 is polarized orthogonally to the lower energy level incoming 1.06 micrometer infrared energy. The shorter wavelength green energy thereby leaves the FIG. 1 apparatus along the path 122. The 1.06 micrometer energy components remaining in the output of the frequency doublers 118 and 130 are prevented from returning to the oscillator 106 by the above referred-to optical isolation filters 107 which are located in the oscillator path 100 and also by an air spark occurring at the focus of the beam expansion telescope described below and located in the oscillator block 106.

The "very low" energy level output signal in the path 122 is developed in the path 104 by way of using only one of the two amplifier rods present in the amplifier 128, the unused rod being maintained in a passive non-pumped state for such occurrences. The gain of the amplifier rod employed for the "very low" energy function is adjusted to achieve incidence of approximately 2 millijoules of 1.06 micrometer return pass energy at the frequency doubler 130 in this instance. As a result of this low incident energy intensity, efficiency in the doubler 130 is minimal in the "very low" energy state of the FIG. 1 apparatus and less than 50 microjoules of 532 nanometer radiation is generated for coupling to the output path 122.

In each of the paths 102 and 104, therefore, the energy received from the oscillator is of such low level that only a small amount of frequency doubling occurs during first passage through the doublers 118 and 130, this oscillator signal doubling has, as a result, minimal effect on the transmission of energy along the paths 102 and 104. The pulse energy level increase during passage through the amplifier rods, however, ensures the occurrence of doubling action after the first pass.

The laser oscillator 106 in FIG. 1 may be disposed according to a variety of arrangements known in the art, however, a neodymium yttrium aluminum garnet rod (Nd:YAG) apparatus capable of operation in the 100-300 Hertz pulse repetition frequency range is preferred. The Nd:YAG rod may be pumped by a xenon flash lamp and may have a 100% reflectance flat mirror at the rear reflector location and a resonant reflector at the rod output end. Optical components are preferably used with the rod amplifiers to assist in phase conjugate enhancement compensation for thermal lensing tendencies in the laser rod, while an optical aperture is used to exclude energy contributions from the birefringent outer portion of the laser amplifier rods.

The amplifiers 116 and 128 preferably employ Q-switching, which is accomplished with a Pockels cell—for example, a lithium niobate cell, and employ fluids such as pressurized nitrogen for cooling. The amplifier rods may have dimensions near 106 mm length, and 5 mm diameter, with a 4.1 mm aperture; a typical flash lamp has an arc length near 94 mm and a bore of 4 mm. The Q-switches, which are not shown in FIG. 1, reside in the cavity or resonator of the oscillator 106 and may be of the two-step opening variety.

An employed Q-switch may consist of a 1-inch lithium niobate crystal which is Z cut and disposed between two birefringent crystalline calcite wedges having opposed apices; such a structure can be made responsive to a switching voltage supplied to the lithium niobate and cause a 180° phase retardation at the laser wavelength. In such a structure, Q-switching is accomplished by selecting distinct angular paths for each polarization and for voltage-on versus voltage-off conditions.

The oscillator 106 also preferably employs a frequency spectrum selective etalon serving to attenuate all except the desired 106 nm spectral range in the oscillator optical output. The resonant reflector used at the output of the oscillator 106 may consist of two uncoated pieces of glass having a refractive index near 1.59 such as the type SK-94 glass manufactured by the Schott Company. With the two uncoated pieces of glass disposed apart by about 1 cm, a peak reflectance in the range of 53% is achieved, however, with the addition of an individual surface at approximately 13 cm from the resonant reflector, a peak reflectivity in the range of 70% is achieved.

The added individual surface may be, for example, a part of a thin plate cut sapphire having an anti-reflection coating on one surface. With this additional 13 cm located etalon, a wider variety of etalon spacings is provided to narrow oscillator etalon resonances and to lower the output coupling of the resonator in order to achieve better narrow linewidth efficiency. With lower output coupling the resonator circulating power is increased from three times the outside power to 5.5 times the outside power, a consideration requiring attention to the question of optical damage to the involved optical components. Such considerations require that the intensity at the Q-switch in a multi-transverse mode resonator be less than 40 mw/cm$^2$ for lithium niobate. In the present example this corresponds to approximately 40 millijoules of output energy with a 40 nanosecond energy pulse.

As indicated above, compensating optics or a compensating telescope is used in the oscillator 106. This telescope may consist of a $-100$ mm focal length lens and a $+127$ mm focal length lens spaced apart by less than the difference of the focal lengths to achieve a negative optical power which is adjustable from 0 to approximately $-2$ diopters. In the present apparatus, telescope adjustment to lens spacings of about 19 mm and a focal length of about $-1.5$ meter can be used to compensate for lensing of the oscillator laser rod at pulse repetition frequencies of 135 Hertz and flash lamp energy levels of 4 joules per pulse. Oscillator beam divergence may be used as a measure of the achieved compensation.

The oscillator xenon flash lamp is preferably arranged to have an optical pulse width near 100 microseconds, measured at the 20% of rise and 80% of fall points, with a rise time of 35 microseconds between the 20% of rise and peak and a fall time of 50 microseconds between peak and 80% of fall points. Electrical techniques which are known in the art including use of a 10 microfarad capacitor and a series inductance in a pulse forming network may be used to achieve electrical waveform pulses of this character.

A laser oscillator arranged according to the above criteria provides an output signal of approximately 25 millijoules energy level at a spectral wavelength of 1.06 micrometers and a pulse repetition frequency of 135 Hertz.

The polarization rotator 108 used in the oscillator signal path 100 may consist of either a Faraday rotator activated by a magnetic field or a Pockels cell of half wavelength activated by an electric field. The polarization rotator 108 serves to rotate the plane of polarization 90° and the polarization rotator together with the polarizing beamsplitter 120 serve as an optical switch. The mirror 110 is used to direct the oscillator energy from the path 100 to the polarizing beamsplitter 120, while maintaining a convenient physical location of the described elements. The mirror 110 is preferably of a planar mirror type commonly used in the optical art. The mirror 110 may, of course, be relocated or dispensed with in alternate physical arrangement of the oscillator and path 100 elements with respect to the beamsplitter 120.

The oscillator 106 and the path 100 elements are preferably arranged to deliver a signal having optical energy in the range of 1 to 5 millijoules at the input of the amplifiers 116 and 128 in the paths 102 and 104. In the "very low" and "low" energy path 104 of the FIG. 1 apparatus, the signal from the path 100 and the oscillator 106 is either subjected to a combination of amplification and phase conjugate enhancement and communicated to the path 122, or phase conjugate reflection enhanced without amplification and communicated to the output path 122—depending upon the presence or absence of pumping in the low energy laser amplifier 128, For the "very low" output level in the path 122, passive transmission through the low energy laser amplifier 128, that is, signal transmission without energization of the pumping flash lamp, is used. This arrangement of the FIG. 1 apparatus, of course, requires that both the "very low" level energy signal received after passive transmission through the amplifier 128 and the higher-level "low" energy signal received after a single pass amplified transmission through the amplifier 128 each be within the energy density range that is acceptable to the preferred stimulated Brillouin scattering (SBS) phase conjugate reflector. In general, this range accommodation by the SBS phase conjugate reflection cell is reasonable for a long focal length (longer interaction length) phase conjugate reflector.

Medium Energy Laser Amplifier

The "medium energy" level amplifier indicated at 116 in FIG. 1 is preferably arranged to employ two neodymium yttrium aluminum garnet laser amplifier rods or other optical gain elements disposed in physical parallelism and located on opposite sides of a single pumping flash lamp in a gas-cooled assembly. In the rod embodiment, one of the amplifier rods, the first path rod, is preferably of 5/16 inch diameter and the other, the second path rod, of ¼ inch diameter. The medium energy amplifier is preferably arranged to have the input signal from the frequency doubler 118 traverse the input 5/16 inch diameter rod for first pass amplification and then be directed by way of a corner reflecting prism and a positive and negative focal length optical telescope into the second path, ¼ inch diameter amplifier rod, for communication to the phase conjugate reflector 114. Each of the medium energy amplifier laser rods are preferably arranged to be of 3 inch length. Such length and the 5/16 diameter rod provide energy storage of near 600 millijoules, and a maximum numerical gain of approximately 8. Generally, the energy stored in the amplifier rod is proportional to the rod diameter and the rod length.

Following phase conjugate reflection in the reflector 114, the "medium" energy amplifier signal makes a return pass through the ¼ inch diameter laser rod, the telescopic optics, the prism corner reflector, and the 5/16 diameter laser rod before entering the optical switch 120 and being transmitted to the output path 122.

Frequency Doubling

In the FIG. 1 apparatus, the frequency doubler 118 receive a 1.064 micrometer wavelength input signal and generates a second harmonic 0.532 micrometer output signal. The frequency doubler preferably consists of a cesium di-deuterium arsenate crystal located in a temperature-controlled oven together with beam intensity changing telescopes used to achieve optimum second harmonic generation. The doubler crystal is preferably cut for 90° non-critical phase matching achieved by temperature tuning. A high degree of deuterium in the crystal is preferable to achieve low energy absorption at the fundamental signal wavelength.

The medium energy amplifier provides an output signal energy level of 600 millijoules per pulse at the 1.06 micrometer wavelength or 300 millijoules per pulse at the 0.532 micrometer wavelength.

Phase Conjugate Reflection

The phase conjugate reflectors indicated at 114 and 126 in FIG. 1 provide a number of performance improving benefits to the FIG. 1 apparatus. More precisely, the enhancement capabilities of phase conjugate reflection on an optical energy beam signal include the following:

(a) Compensation for beam wander effects;
(b) Compensation for beam distortion;
(c) Compensation for thermally induced amplifier lensing;
(d) Compensation for thermally induced doubler lensing:
(e) Compensation for phase wavefront distortions;
(f) Reduction or elimination of birefringence errors;
(g) Elimination of phase distortion introduced by frequency doubling;
(h) Elimination of beam steering errors introduced by frequency doubling;
(i) Compensation for misalignment of elements;
(j) Compensation for physical vibration effects on elements of the source; and
(k) Compensation for laser media turbulence (where fluid media lasers are used).

The elimination of beam wander effects, thermal lensing effects and frequency doubler effects are especially important to the FIG. 1 apparatus. These and other characteristics of phase conjugate reflectors are now well known in the optical art.

The components used in the combined "low energy" and "very low energy" path 104 in FIG. 1 are similar to the components in the medium energy path 102 with certain exceptions to accommodate the different energy levels involved, phase conjugate reflection accomplished in the block 126 is also a notable element of the path 104 processing.

Low Energy Amplifier

The "low" and "very low" energy amplifier 128 is also preferably arranged as a two-laser rod amplifier wherein the rod first receiving the oscillator signal and last amplifying the reflected signal is of a 10.6 cm length and a 4.3 mm diameter and the remaining amplifier rod, the rod transmitting signal to the phase conjugate reflector 126 and also receiving the reflected signal is provided with a length of 10.6 cm and a diameter of 5 mm. Small diameter amplifier rods are preferred because of the improved gain performance and improved extraction efficiency attainable therewith, however, in view of the smaller heat dissipating surface and smaller optical cross-sectional area, of such rods, they are not without disadvantages, especially with respect to thermal dissipation considerations. The rods in the amplifier 128 and indeed, in the amplifier 116 may also be subject to undesirable longitudinal amplified spontaneous emission and transfers from the pumping of the laser rod either of which may result in amplifier gain saturation. Such effects and the design practice needed to overcome these effects are known in the laser art. The rods in the amplifier 128 are also preferably made of neodymium yttrium aluminum garnet material.

Rough grinding of the rod cylindrical surface in the amplifier 128 is desirable in order to minimize the effects of fresnel reflection of spontaneous emission at the interface of the amplifier rod and a surrounding gaseous atmosphere, parasitic depumping processes including whisper modes and light pipe modes of operation are minimized by rough-ground rod surfaces.

In the amplifier rod arrangement preferred for the amplifier 128, heating of the amplifier rods results from heat energy absorption that is approximately two to three times the energy stored in the rod—rod heating is generally proportional to rod stored energy. However, an improvement in energy extraction efficiency can result in decreased energy storage and reduced rod heating. Heat removal from an amplifier rod is, in addition, directly proportional to the rod surface area. Interferometer techniques which are known in the art may be used to determine rod heating in a particular environment. In the herein preferred environment for the amplifier rods, an energy storage efficiency in the range of 2.5% is achievable. With this environment, the ratio of heat deposited in the rod to energy stored is in the order of 2.2.

The Frantz-Nodvik amplifier equation can be used to relate physical parameters performance characteristics of amplifiers such as those used in the blocks 116 and 128 in FIG. 1. The Frantz-Nodvik equation and its use in connection with laser amplifiers is described in an article by L. M. Frantz and J. S. Nodvik, "Theory of pulse propagation in a Laser Amplifier" appearing in the *Journal of Applied Physics.* Vol. 34, page 2346, August 1963. For the "low" and "very low" energy amplifier 128, assuming a phase conjugate reflection of 80% and an oscillator input energy level of 1.5 millijoules and an amplifier small signal gain of 11 dB, the energy level after a first pass through the 4.3 mm rod is predicted by this equation to be in the order of 18 millijoules. Following phase conjugate reflection and a second pass, an energy level of about 100 millijoules is predicted. These performances are achieved with an amplifier lamp input energy near 8.5 joules. A 100 millijoule output can be obtained with a stored energy of 205 millijoules and the 4.3 mm rod. Such an arrangement provides an efficiency near 1.2% with a total input power of approximately 2550 watts in order to achieve a 30 watt output.

Low and Very Low Energy Level Phase Conjugate Reflector

The reflector 126 in the path 104 of FIG. 1 is also preferably arranged to comprise a stimulated Brillouin scattering cell phase conjugate reflector. Methane gas at a pressure of 2100 psi is preferably used as the reflecting medium in both of the reflectors 114 and 126 in FIG. 1. The signal energy coupled into cells of this type is focused to a diameter near 4.5 mm and has an energy intensity level near 1 GW/cm$^2$ through the use of a 75 mm focusing lens. At the 20 millijoule signal level, phase conjugate reflectivity in the range of 50% is achieved in this cell, while the higher efficiencies recited above are achieved at greater signal levels. The achievement of these desirable phase conjugate reflections requires the previously indicated signal input energy levels in the range of 40 to 50 millijoules. The finally arranged low energy and very low energy amplifier employs a quarter-wave plate and polarizer between the oscillator and the amplifier for isolation. The double-pass amplifier in the preferred arrangement provides a 100 millijoule output with a flashlamp energy input of 10 joules and an oscillator signal energy of 4.5 millijoules.

Optical Switch

The optical switch is a combination of the polarizing beam-splitter 120 and polarization rotator 108 in FIG. 1 and directs oscillator energy into one of the amplifier paths 102 or 104. This switch is preferably embodied as a Pockels cell in combination with a polarizing prism or beamsplitter located after the Pockels cell to direct the oscillator beam to either of the two amplifier paths. A Glan-Foucault prism is preferred for the prism; in prisms of this type the optical axis is parallel to prism entrance or exit faces and therefore perpendicular to all ray directions. Anti-reflection coating at the two internal faces of the prism is preferred in order to minimize Fresnel losses at the internal faces. A Glan-Taylor prism is found to be unsatisfactory for use in the beam-splitter-optical switch 120 because one of the four optical paths through such prisms is found not to transmit the extraordinary optical ray in the desired direction. The extraordinary ray in such prisms travels through the crystal in a direction closely parallelling the optical axis and thereby incurs incorrect index of refraction and is reflected back toward the oscillator in lieu of being transmitted as an output ray. The preferred Glan-Foucault prism has a generally parallellogram peripheral outline with all faces cut normal to the entrance and exit ray paths, and is preferably made of calcite.

The size of the energy beam emerging from the medium energy path 102 requires consideration of the possibility of damaging one or more of the optical surfaces in the beamsplitter 120 Glan-Foucault polarizer, preferably, the optical telescope used in the oscillator path 100 is arranged to achieve a beam diameter in the range of 7.9 mm at the Glan-Foucault polarizer.

The degree of parallelism achieved between mating surfaces in the Glan-Foucault polarizer is found to be important with respect to the desired maintenance of a common boresight axis at different energy levels of operation in the FIG. 1 apparatus. The essence of this problem is that the beam from the different paths 102 and 104 traverses different paths within the prism and relies upon reflections from two different and imperfectly parallel surfaces within the prism. A tilt of 300 microinches across a ½ inch face of the polarizer, for example, can result in a boresight axis change of 1.3 milliradians between the low and very low energy signals emerging from the path 104 and the medium energy signal emerging from the path 102 in FIG. 1. This 300 microinches across a ½ inch face corresponds to a tilt between polarizer parallel faces of approximately eight interference band waves. Variations of this magnitude are however within the range of accepted manufacturing tolerances for such prisms.

Thin Film Polarizer

An alternate arrangement of the invention capable of circumventing this boresight shift difficulty can be achieved with a one surface polarizing device such as a two-wavelength, thin film polarizer. Devices of this type are manufactured by Optical Coating Laboratories Inc.. 2789 North Point Parkway, Santa Rosa, Calif. 95407 Such thin film polarizers can be designed to function at the 0.53 and 1.06 micrometer wavelengths of interest in the present embodiment, and can have high energy level damage thresholds in the range of 600 milliwatts/cm for 20 nanosecond laser pulses, reasonably good extinction in the range of 17 to 20 dB, S-polarization reflectivities in the 97 to 99% range, and P-polarization transmissions above the 90% value for both wavelengths. Wavefront distortion in the range of 1/10 wavelength or better is achievable for both transmitted and reflected energy beams in such devices.

Even with the use of a thin-film polarizer, the FIG. 1 apparatus may incur boresight shifts in the range of 0.25 milliradian between output from the path 102 and the path 104. Such shifting occurs as a result of the apertures of the two separate amplifier paths seeing different portions of the oscillator beam. More specifically, since the oscillator beam is multi-moded and possibly not exactly collimated and also does not have a plane wavefront, the wavefronts and different transfer spatial positions in the beam are pointing in different directions and the amplifier apertures may therefore see non-identical portions of the beam that have diverging directions. Maintaining the best possible telescope collimation and resonator compensation can minimize the degree of achieved boresight shift between different amplifier paths in the FIG. 1 apparatus.

Figure 3:
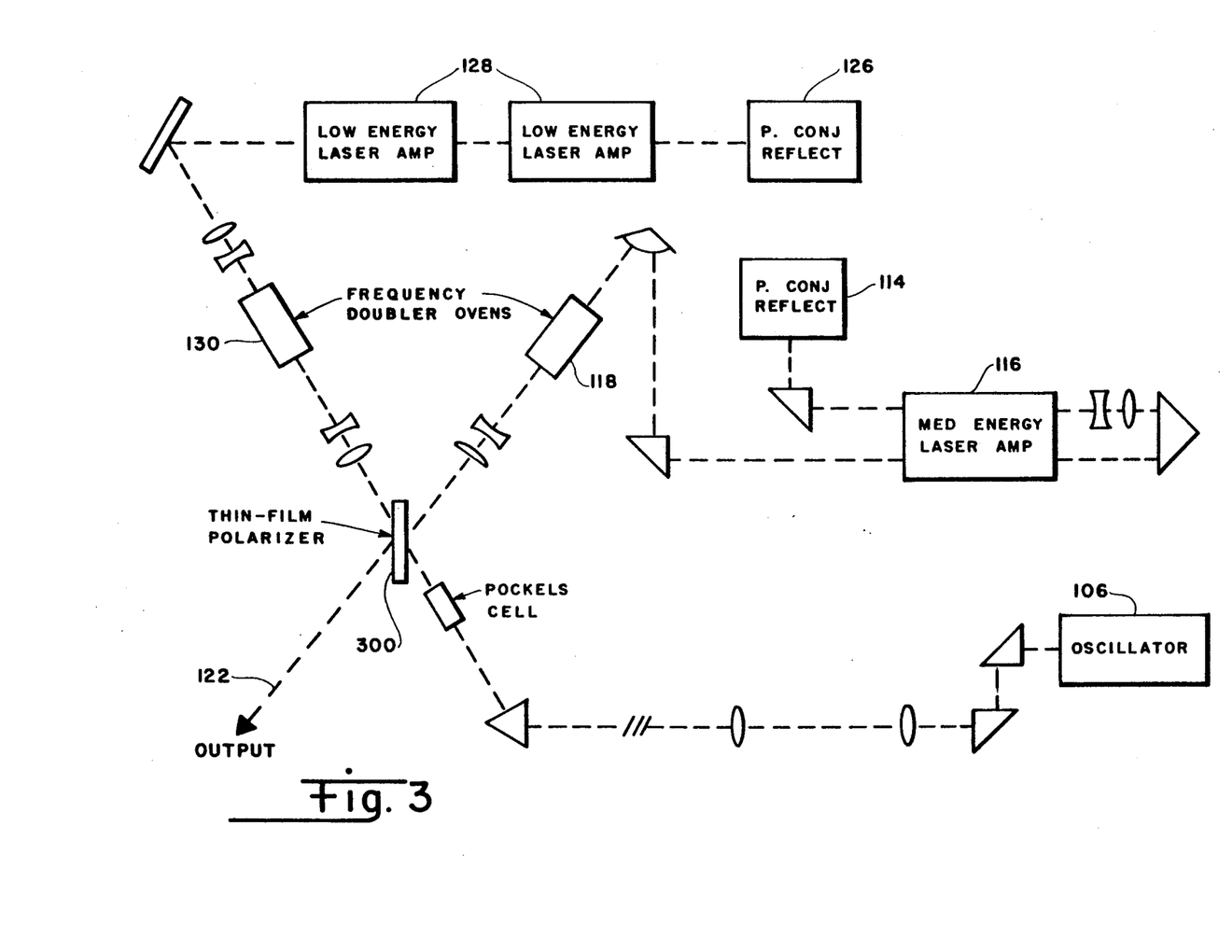
FIG. 3 is an alternate embodiment arrangement of the FIG. 1 apparatus.

Use of thin film polarizers is nevertheless a possible advantage and requires a physical reconfiguration of the FIG. 1 apparatus because of differing polarizing angles for the thin film polarizer and calcite polarizer embodiments of the beamsplitter 120. A preferred arrangement for a thin film polarizer embodiment of the FIG. 1 apparatus is shown in FIG. 3 of the drawings. In the FIG. 3 embodiment of the invention, therefore, the thin film polarizer 300 functionally replaces the optical switch 120. Many the elements in FIG. 3 other than the switch 120 correspond to similar elements in FIG. 1 and are therefore identified with the numbers used in FIG. 1 where possible. Some additional optical elements and some realignment of components is also involved in the FIG. 3 apparatus, as will be understood by persons skilled the art.

The FIG. 3 thin film polarizer embodiment 0.25 milliradian or less boresight shift can be further improved with improvement of the Pockels cell element shown in FIG. 3 or by replacement of the Pockels cell by a quarter-wave plate adjusted to send equal amounts of oscillator energy to each amplifier leg, the latter arrangement of course being somewhat inefficient with respect to optical energy utilization. Absence of the phase conjugate reflector seeing the entire wavefront or the same portions of the wavefront are the underlying cause of the remaining small boresight angular shift in the FIG. 3 embodiment of the invention.

Frequency and Time Considerations

The FIG. 1 apparatus is capable of producing 550 millijoule pulses of optical energy at a pulse repetition frequency of 10 Hertz. 100 millijoule pulses at a pulse repetition frequency of 135 Hz and 50 microjoule or smaller pulses at 135 Hertz pulse repetition frequency. Switching between these functional modes can be achieved with one interpulse period of 7.4 milliseconds. The amperage power handling capability of the elected oscillator and amplifier components in the FIG. 1 apparatus are the ultimate limitations of operating frequency.

Frequency doubling is, of course, employed in the FIG. 1 apparatus in order to achieve output energy within the visible spectrum despite the unavailability of desirable laser components in the visible optical spectrum range. Doublers of the type described can achieve 30 percent or greater efficiency.

Serial Amplifier Embodiments

Figure 2:
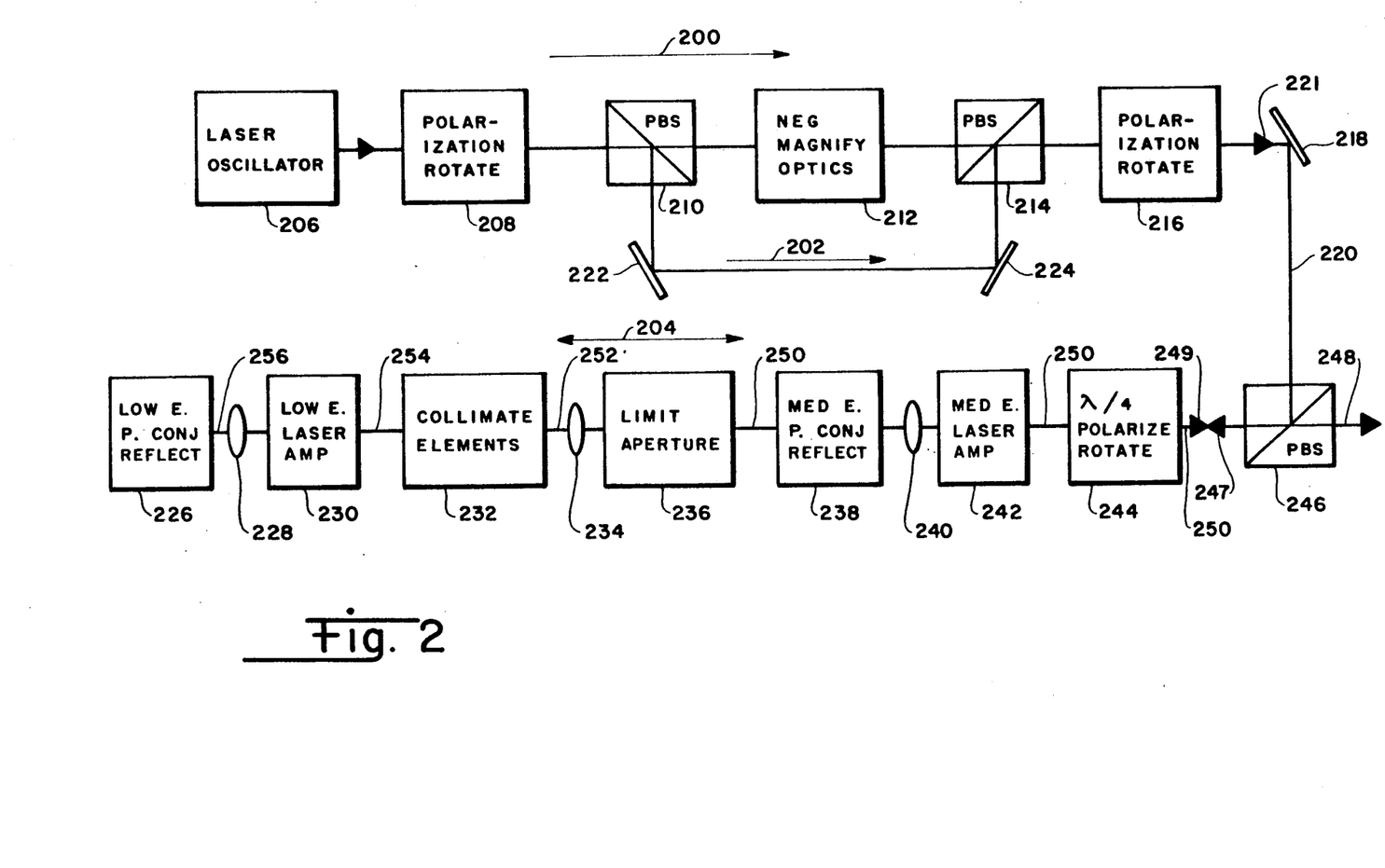
FIG. 2 is a block diagram of a serially organized variable energy level constant boresight laser apparatus.

Another Optical arrangement for a multiple energy level, common boresight multiple pulse repetition frequency laser apparatus is shown in FIG. 2 of the drawings. In the FIG. 2 arrangement, the "low"/"very low" and "medium" energy paths 104 and 102 of the FIG. 1 embodiment are disposed in tandem or series in order to achieve simplification and cost reducing benefits. These benefits are, however, as described below, achieved at the expense of possible operating energy threshold difficulties.

The FIG. 2 apparatus includes a laser oscillator 206 of the type described for the FIG. 1 apparatus, this oscillator and the succeeding components which process the oscillator signal are disposed along an oscillator signal path 200 which terminates in the FIG. 2 polarizing beamsplitter-optical switch 246. The path 200 also includes the controllable polarization rotator 208, the polarized beamsplitters 210 and 214, the magnifying optics 212, the polarization rotator 216 and the planar corner reflecting mirrors 218, 222 and 224.

Optical energy from the oscillator 206 and the path 200 is received in the amplifier and reflector path 204 by way of the optical switch 246. This received energy traverses a selectable portion of the path 204 as indicated by the arrow 247 in response to the energy level desired in the output path 248. The path 204 includes the medium energy phase conjugate reflector 238 and medium energy laser amplifier 242 which cooperate to provide output signals having energy content near 550 millijoules per pulse in the path 248. Alternately, the output energy in the path 248 may involve the "low" and "very low" energy phase conjugate reflector 226 and either passive or amplified transmission through the low energy laser amplifier 230, together with passive transmission in the medium energy reflector and amplifier 238 and 242. The path 204 also includes the collimating element 232, the optical lenses 234 and 240, and the quarter-wave polarization rotator 244.

In operating the FIG. 2 apparatus, the energy density of the oscillator signal communicated along the path 200 and received at the phase conjugate reflector 238 is electively determined by the presence or absence of the negative magnifying optics 212 in the path 200. The alternate path leg 202 is used to bypass the negative magnifying optics 212 and thereby present a higher energy density signal along the path 220 when the polarization rotator 208 is controlled to produce signal diversion into the alternate path leg 202 at the beamsplitter 210.

A determination of whether phase conjugate reflection or passive transmission occurs in the medium energy phase conjugate reflector 238 involves both the energy density of the optical signal received along the path 220 and the presence or absence of pumping in the medium energy laser amplifier 242. When an energy signal in the "medium" energy range, that is, in the range of 550 millijoules per pulse, is desired along the path 248 from the FIG. 2 apparatus, the energy density of the signal along the path 220, is made sufficiently great and pumping in the amplifier 242 enabled in order that both phase conjugate reflection occur in the medium energy reflector 238 and second pass saturation amplifying occur in the amplifier 242. Alternately, with lower energy density for the signal along the path 220 and absence of pumping in the amplifier 242, the phase conjugate reflector 238 is arranged to transmit energy in a sub reflection threshold mode so that reflection, and amplification may occur in the "low" energy amplifier 230 and the "low" energy phase conjugate reflector 226.

Selection between the "low" and "very low" energy output levels in the apparatus of the FIG. 2 series disposed path 248 is accommodated by insuring that the oscillator 206 produces enough energy to activate the phase conjugate reflector 226 under all expected conditions. The reflector dynamic range required to operate "low" and "very low" is achievable with a long interaction length phase conjugate reflector at 226.

The quarter-wave length polarization rotator 244 in FIG. 2 may be embodied in the form of a frequency doubling element, as has been demonstrated by N. F. Andreev et al, in the publication "Coherent Frequency Doubling in Non-Linear Non-Homogeneous Elements" published in the periodical "Translation of JETP Pis'ma Vzhurnal Eksperimental" noi i Teore Ticheskoi Fiziki, Letters to Journal of Experimental and Theoretical physics, Academy of Sciences of the USSR, JETp Letters), Vol. 30, No. 5, page 286 (1979). The lens 240 serves to focus energy from the path 220 into the phase conjugate reflector 238. The reflector 238 is preferably of the stimulated Brillouin scattering type. Depolarization correction as described in the publication "Inversion of Wavefront in SMBS of a Depolarized pump" published by N. G. Basov et al in JETP Letters, Vol. 28, No. 4, page 197 (1978) can also be employed to accomplish polarization wavefront correction in connection with the phase conjugate reflector 238.

If the medium energy amplifier 242 has been activated, that is, if pumping energy is supplied to the amplifier 242, the optical beam is reflected from the phase conjugate reflector 238 for a second pass through the amplifier 242. Following second pass amplification, the beam passes through the quarter-wave polarization rotation 244 and the optical switch 246 to reach the output path 248, as is indicated by the arrow 249.

In the event pumping energy is withheld or other deactivation of the amplifier 242 occurs, energy received along the path 220 passes through the amplifier 242 and the reflector 238 to the limiting aperture 236 which serves to protect the optical elements 232, 230 and 226. Lens 234 acts with lens 240 to provide a parallel beam to the collimate elements and in the blocks 232. Collimate elements 232 change the diameter of the beam to the optimum size for amplifier 230. In the low energy laser amplifier 230, amplification up to a signal level capable of achieving efficient phase conjugate reflection in the reflector 226 is achieved during a first amplifying pass and additional amplification of the phase conjugate reflected signal occurs during a second amplifying pass. The "low" energy amplified signal proceeds along the path 204 through the medium energy phase conjugate reflector 238 and medium energy laser amplifier 242 to the output path 248. Phase conjugate reflection of the low energy amplified signal does not occur during reverse passage through the medium energy reflector 238 because the energy density is below the threshold of activation of the phase conjugate reflector 238.

The lenses 228 and 240 in FIG. 2 provide concentration of the beam energy to be reflected to a density assuring optimum phase conjugate reflection in the reflectors 226 and 238, respectively. The quarter-wave polarization rotation function may also be achieved in a frequency doubling element according to the principles additionally described by M. F. Andreev et al in the "Coherent Frequency Doubling in Non-Linear, Non-Homogeneous Elements" article supra.

Energy level considerations limit the flexibility of the FIG. 2 apparatus, since the power density regime wherein satisfactory operation of the described series disposed elements occurs is bounded at one end by the stimulated Brillouin scattering threshold of the phase conjugate reflector 238 and at the other end by the requirement that output power density along the path 248 be greater than the density needed for efficient non-linear usage of the output signal as is described below herein. Typically, the power density required in the "medium energy" phase conjugate reflector 238 is below 500 milliwatts/cm$^2$, while the non-linear energy requirements at the output path 248 resides between 50 milliwatts/cm$^2$ and 200 milliwatts/cm$^2$. According to these range limitations, the series configuration of FIG. 2 can provide "medium energy" and "low energy" operations having energy densities of one order of magnitude or greater difference through the use of controlled reflector interaction lengths as determined by lens focal lengths as described above.

In addition to energy level considerations, the FIG. 2 series disposed apparatus requires that oscillator signal from the path 200 propagate through all elements along the path 204, especially the two amplifiers 230 and 242 wherein prospects for thermal lensing and other undesirable effects are significant. Temperature changes inherent in operation of the amplifier rods often result in thermal lensing distortions of the oscillator signal—distortions which are partially but possibly not totally offset by the beneficial effects of phase conjugate reflection in the reflectors 226 and 238.

Phase conjugate enhancement of reflected signals is in general limited by the extent to which all aberrated light is collected by the phase conjugate reflector. Amplifier rod thermal lensing can be a limiting factor in a phase conjugate enhanced apparatus in that such lensing often precludes satisfactory total collection of the aberrated light. This effect is especially notable in the presence of short focal length lensing of the amplifier rods and may be further compounded by bifocusing effects. The FIG. 2 series configuration of the multiple energy level laser apparatus is less susceptible to interface with external units by way of polarization discrimination than is the parallel configuration apparatus of FIG. 1, since all elements in the phase conjugate path go through the same common optical paths all of the time.

The herein described apparatus therefore provides a capability for achieving multiple energy level laser output in combination with common boresight axis and differing laser pulse repetition frequencies. The apparatus is especially enhanced by the use of phase conjugate reflection which provides compensation for inter alia energy beam aberrations, beam wander, and birefringent effects. Moreover, such compensation is accomplished with fast response times, times less than 10 nanoseconds or a bandwidth of greater than 100 MHz, and is achieved without the use of active compensating devices such as distortable mirrors in feedback loops and without the use of a reference beam or other complex and misalignment-susceptible apparatus.

Phase conjugate reflection in the described embodiments of the apparatus has been achieved using stimulated Brillouin scattering (SBS) in a pressurized gas such as methane. It will be understood, of course, by persons skilled in the art that other forms of phase conjugate reflection may be employed in different embodiments of the invention.

While the apparatus and method herein described constitute a preferred embodiment of the invention, it is to be understood that the invention is not limited to this precise form of apparatus or method, and that changes may be made therein without departing from the scope of the invention, which is defined in the appended claims.

I claim:

1. Multiple energy level, common boresight, laser apparatus comprising the combination of:
    a laser oscillator source of low energy level optical beam signal;
    a first laser amplifier disposed along an axis, said first amplifier having both an amplifying operating mode and a signal conducting operating mode and having first and second optical signal communication ports located on said axis at opposed amplifier ends, said second amplifier port comprising an output port for said apparatus;

first selecting means for electing one of said amplifying and conducting operating modes in said first laser amplifier;

means for directing said oscillator low energy level optical beam signal along said axis into said second port of said first laser amplifier;

first phase conjugate reflector means located along said axis at the first port end of said first laser amplifier for receiving an optical signal therefrom and for returning a phase conjugate enhanced variation of said optical signal to said first port;

second selection means for electing between an energy reflection and an energy transmitting operating mode in said first phase conjugate reflector means;

a second laser amplifier disposed in signal communication disposition with optical energy transmitted by said first phase conjugate reflector means, and receiving reflector means transmitted energy therefrom during said energy transmitting and first reflector means operation; and second phase conjugate reflector means located in signal communication disposition with said second laser amplifier for receiving an optical signal therefrom and for returning a phase conjugate enhanced variation of said received optical signal to said second laser amplifier;

whereby the phase conjugate enhanced single boresight axis optical signal delivered at said apparatus output port includes electable reflection and amplification to a plurality of different energy levels by selectable of said serially disposed first and second laser amplifier and phase conjugate reflector pairs.

2. The apparatus of claim 1 wherein said second laser amplifier is of lower optical energy output capability than said first laser amplifier.

3. The apparatus of claim 2 wherein said means for directing said low energy level optical beam signal includes a polarizing beamsplitter disposed along said axis adjacent said amplifier output second port.

4. The apparatus of claim 3 further including polarization rotation means disposed in each of the optical paths entering said polarizing beamsplitter.

5. The apparatus of claim 1 wherein said first selection means includes optical magnifying mean preceded by and followed by polarizing beamsplitter means and a bypassing optical signal path joining said beamsplitter mean for selectably concentrating said laser oscillator optical beam signal to the activating energy density threshold of said first laser amplifier.

6. Multiple energy level, common boresight, laser apparatus comprising the combination of:

a laser oscillator source of low energy level optical beam signal;

a first laser amplifier disposed along a first axis, said first amplifier having both an amplifying operating mode and a signal conducting operating mode and having first and second optical signal communicating ports located on said first axis at opposed amplifier ends, said second amplifier port comprising an output port for said amplifier;

first selecting means for electing one of said amplifying and conducting operating modes in said first laser amplifier;

first phase conjugate reflector means located along said first axis at the first port end of said first laser amplifier for receiving an optical signal therefrom and for returning a phase conjugate enhanced variation of said optical signal to said first port;

a second laser amplifier disposed along a second axis, said second amplifier having first pass input and output ports at first and second ends thereof and second pass input and output ports coincident with said first pass output and input ports at said second and first ends, respectively;

second phase conjugate reflector means located along said second axis at said amplifier second end for receiving a first pass optical signal from said amplifier second end port and for returning to said second pass input port a phase conjugate enhanced variation of said first pass optical signal;

means for directing said laser oscillator low energy level optical beam signal along a selected one of said first and second axes into one of said first and second amplifier input ports; and means for directing the output energy from a selected one of said first and second laser amplifiers along a common output energy axis of said apparatus;

whereby the phase conjugate enhanced single boresight axis optical signal delivered at said output port is selectably reflected and amplified by a controllable one of said parallel disposed first and second laser amplifiers and first and second phase conjugate reflector pairs.

7. The apparatus of claim 6 wherein said second laser amplifier is of lower optical energy output capability than said first laser amplifier.

8. The apparatus of claim 7 wherein said first and second axes and said first and second amplifiers are parallel path disposed with respect to each other.

9. The apparatus of claim 8 wherein said means for directing laser oscillator energy and said mean for directing output energy comprise a single polarizing beamsplitter energy directing means.

10. The apparatus of claim 9 wherein said single polarizing beamsplitter energy directing means includes a plurality of optical prisms.

11. The apparatus of claim 9 wherein said single polarizing beamsplitter energy directing means includes a thin-film beamsplitting element.

12. The apparatus of claim 9 further including polarization altering means disposed along each of said axes adjacent a port of each said amplifier in the optical path of said amplifiers.

13. The apparatus of claim 9 further including optical frequency doubler means disposed along each of said axes adjacent a port of each said amplifiers and in the optical path of said amplifiers.

14. The apparatus of claim 11 further including polarization rotation means located in the optical path intermediate said laser oscillator and said polarizing beamsplitter.

15. The apparatus of claim 9 wherein said phase conjugate reflector means includes a pressurized gas stimulated Brillouin scattering non-linear fluid phase conjugate reflector.

16. The apparatus of claim 15 wherein said gas is methane.

17. Laser apparatus capable of multiple optical energy level output directed along a common boresight axis comprising the combination of:
   means disposed along a first optical path for generating a very low energy level optical beam, said means including:
      a first neodymium yttrium aluminum garnet rod Q-switched laser oscillator,
      controllable polarization rotated means for determining the non-rotated and ninety-degree rotation status of the optical beam energy output of said laser oscillator;
   means disposed along a second optical path for selectably amplifying and processing said very low energy level optical beam to a medium energy level said means including:
      frequency doubler means for quarter wave rotating optical energy flowing along said second optical path,
      a flash lamp pumped second neodinium yttrium aluminum garnet rod laser amplifier having controllable active amplifying and passive transmitting operating states, and
      pressurized methane gas phase conjugate retroreflector means for optically enhancing a reflected signal returning along said second optical path;
   means disposed along a third optical path for selectably amplifying and processing said very low energy level optical beam selectably to an optically enhanced very low energy level beam and to an enhanced low energy level beam, said means including:
      frequency doubler means for quarter wave rotating optical energy flowing along said third optical path,
      a flash lamp pumped third neodymium yttrium aluminum garnet rod laser amplifier having controllable active amplifying and passive transmitting operating states, and
      pressurized methane gas phase conjugate retroreflector means for optically enhancing a reflected signal returning along said third optical path;
   directing means for directing optical energy from said oscillator first optical path to said second and third optical paths; and
   directing means for directing optical energy from said second and third optical paths to an output path of said apparatus.

18. The apparatus of claim 17 wherein said directing means comprise a single optical beamsplitter element.

19. The apparatus of claim 17 wherein said directing means comprise a polarizing optical beamsplitter switching element.

20. The apparatus of claim 17 further including means for selectably controlling the operation of said polarizing optical beamsplitter element and the direction of first path optical energy along said second path and along said third path.

* * * * *

UNITED STATES PATENT AND TRADEMARK OFFICE
CERTIFICATE OF CORRECTION

PATENT NO.   : 5,162,940
DATED        : November 10, 1992
INVENTOR(S)  : Joseph E. Brandelik It is certified that error appears in the above-identified patent and that said Letters Patent is hereby corrected as shown below:

```
Column  5, line 48, "SK-94" should be -- SK-14 --.
Column  5, line 62, a comma should follow "coupling".
Column  6, line 61, the comma should be a period.
Column  8, line 23, the comma should be a period.
Column  8, line 23, "phase" should be --Phase--.
Column  8, line 55, the comma should be a period.
Column  8, line 55, "parasitic" should be --Parasitic--.
Column 10, line 16, the comma should be a period.
Column 10, line 17, "preferably" should be --Preferably--.
Column 10, line 37, "however" should be -- , however, --.
Column 10, line 46, "Inc.." should be -- Inc., --.
Column 10, line 47, a period should follow "95407".
Column 10, line 51, "cm" should be -- cm² --.
Column 11, line 38, the period should be a comma.
Column 13, line 5, "JETp" should be -- JETP --.
Column 15, line 51, "mean" should be -- means --.
Column 16, line 41, "mean" should be -- means --.
```

Signed and Sealed this

Fourth Day of January, 1994

*Attest:*

BRUCE LEHMAN

*Attesting Officer*         Commissioner of Patents and Trademarks